May 1, 1951  M. J. TERRY, JR  2,551,301
GUIDE LEVEL FOR BORING DRILLS
Filed Sept. 28, 1948

INVENTOR.
Michael Joseph Terry, Jr.
By L. B. James
ATTORNEY

Patented May 1, 1951

2,551,301

UNITED STATES PATENT OFFICE 2,551,301

GUIDE LEVEL FOR BORING DRILLS

Michael Joseph Terry, Jr., Beverly, Mass.

Application September 28, 1948, Serial No. 51,631

1 Claim. (Cl. 33—207)

This invention relates to boring drills and more particularly a level therefor.

The primary object of this invention resides in so securing a level to a boring drill that it can be readily manipulated to insure either true vertical or horizontal boring by the operator of the drill.

Another object of this invention resides in hingedly securing a level to a boring drill so the operator of the boring drill will have a visible guide to permit him to bore holes on true horizontal and vertical lines.

A further object of this invention resides in the combination of a boring drill and level hingedly attached thereto.

A still further object of this invention resides in the particular construction of the lever.

With these and other objects in view, this invention resides in certain novel features of construction and arrangement of elements to be hereinafter more particularly set forth in the specification, illustrated in the accompanying drawing and pointed out in the appended claim and, although this disclosure depicts my present conception of the invention, the right is reserved to resort to such departures therefrom as come within the scope of the claim.

In the accompanying drawing forming a part of this application:

Figure 1:
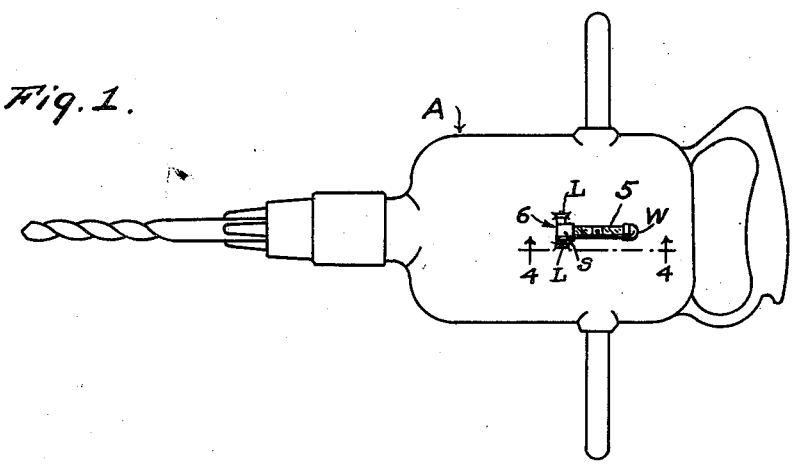
Fig. 1 is a plan view of a boring drill showing the level secured thereto and in position for horizontal boring.
Figure 2:
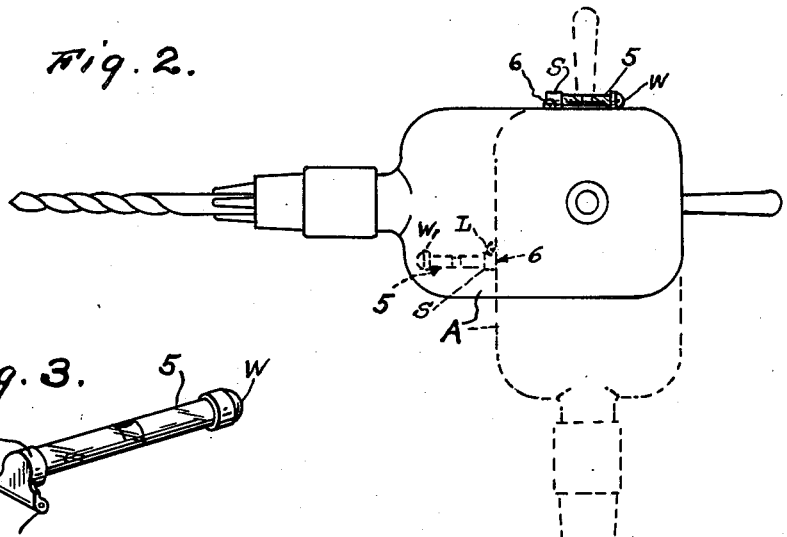
Fig. 2 is a side view thereof showing the level in full lines for horizontal boring and dotted lines for vertical boring.
Figure 3:
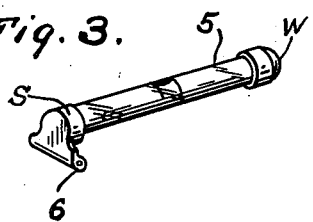
Fig. 3 is a perspective view of the level per se.
Figure 4:
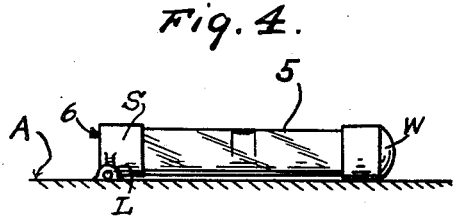
Fig. 4 is an enlarged side view showing the level secured for horizontal boring.

In the present illustration of this invention, the letter A designates a conventional boring drill having spaced lugs L secured to its body portion to pivotally support an elongated tubular spirit level 5 through the instrumentality of a substantially inverted T-shaped hinge leaf 6 which is provided with a right angularly disposed socket S formed on its staff portion to receive and secure the inner end of the tubular spirit level therein. The outer end of said spirit level is provided with a cylindrical cap W adapted to dispose the transparent spirit level in spaced parallel relation to the surface of the boring drill when it is used to operate the same on a horizontal plane and, when the boring drill is to be operated on a vertical plane, the spirit level is swung outwardly on its pivot until the hinge leaf thereof rests against the surface of the drill and the spirit level disposed at right angles thereto. Said hinge leaf of the spirit level is pivotally secured between the aforesaid lugs with sufficient friction therebetween to retain it in elected positions about its axis, however, any conventional form of friction means may be provided to secure the spirit level against moving from its adjusted position on the drill.

Through the instrumentality of the aforesaid combination of elements, the level is normally retained against the casing of the boring drill in position for drilling horizontal holes and when used as a visible guide for drilling vertical holes, the operator of the drill simply swings it to right angles to its normal position where it will remain in rigid relation to the drill casing until the operator reverses said operation.

With this invention fully set forth, it is manifest that means are provided whereby the operator of a boring drill is provided with a visible guide to permit true boring on either horizontal or vertical lines and, through the simplicity of the elements set forth, the cost of manufacture of the same and attachments thereof to drills is reasonable.

Having thus described my invention, what I claim and desire to protect by Letters Patent is:

The combination with a boring drill having spaced apertured lugs secured to the body portion thereof, a substantially inverted T-shaped hinge leaf including a staff portion pivotally disposed between said lugs, a socket formed on the staff portion of the hinge leaf and extending outwardly at right angles thereto, an elongated cylindrical spirit level secured at its inner end in said socket, and a cap of greater diameter than the cylindrical spirit level secured on the outer end thereof and spacing the same in parallel relation to the adjacent surface of the boring drill when it is disposed in horizontal working position.

MICHAEL JOSEPH TERRY, JR.

REFERENCES CITED

The following references are of record in the file of this patent:

UNITED STATES PATENTS

| Number | Name | Date |
|---|---|---|
| 312,266 | Gurley | Feb. 17, 1885 |
| 1,186,063 | Arkin | June 6, 1916 |
| 1,255,644 | Roth | Feb. 5, 1918 |
| 1,333,559 | Moulton | Mar. 9, 1920 |
| 1,928,172 | Eglinton | Sept. 26, 1933 |